United States Patent [19]
Prohofsky

[11] 3,810,116
[45] May 7, 1974

[54] VOLATILE MEMORY PROTECTION

[75] Inventor: Leroy A. Prohofsky, Minneapolis, Minn.

[73] Assignee: Sperry Rand Corporation, New York, N.Y.

[22] Filed: Nov. 24, 1972

[21] Appl. No.: 309,017

[52] U.S. Cl. .................. 340/172.5
[51] Int. Cl. .................. G05b 11/00
[58] Field of Search .................. 340/172.5, 174.1 R

[56] References Cited

UNITED STATES PATENTS

| | | | |
|---|---|---|---|
| R27,485 | 9/1972 | McGilvray et al. | 340/172.5 |
| 3,189,788 | 6/1965 | Cady | 340/253 B |
| 3,533,082 | 10/1970 | Schnabel et al. | 340/172.5 |
| 3,535,560 | 10/1970 | Cliff | 340/172.5 |
| 3,623,014 | 11/1971 | Doetz et al. | 340/172.5 |
| 3,654,603 | 4/1972 | Gunning et al. | 340/172.5 |
| 3,147,462 | 9/1964 | Levinson et al. | 340/174.1 R |

*Primary Examiner*—Paul J. Henon
*Assistant Examiner*—Michael Sachs
*Attorney, Agent, or Firm*—Kenneth T. Grace; Thomas J. Nikolai

[57] ABSTRACT

A system for capturing the information stored in a volatile semiconductor memory upon electrical house-power loss is disclosed. The system includes a standby nonvolatile rotating memory-alternator combination which upon power failure utilizes its stored kinetic energy to continue rotating and thus generate the required electrical power to record in the nonvolatile memory the information held in the volatile memory.

5 Claims, 1 Drawing Figure

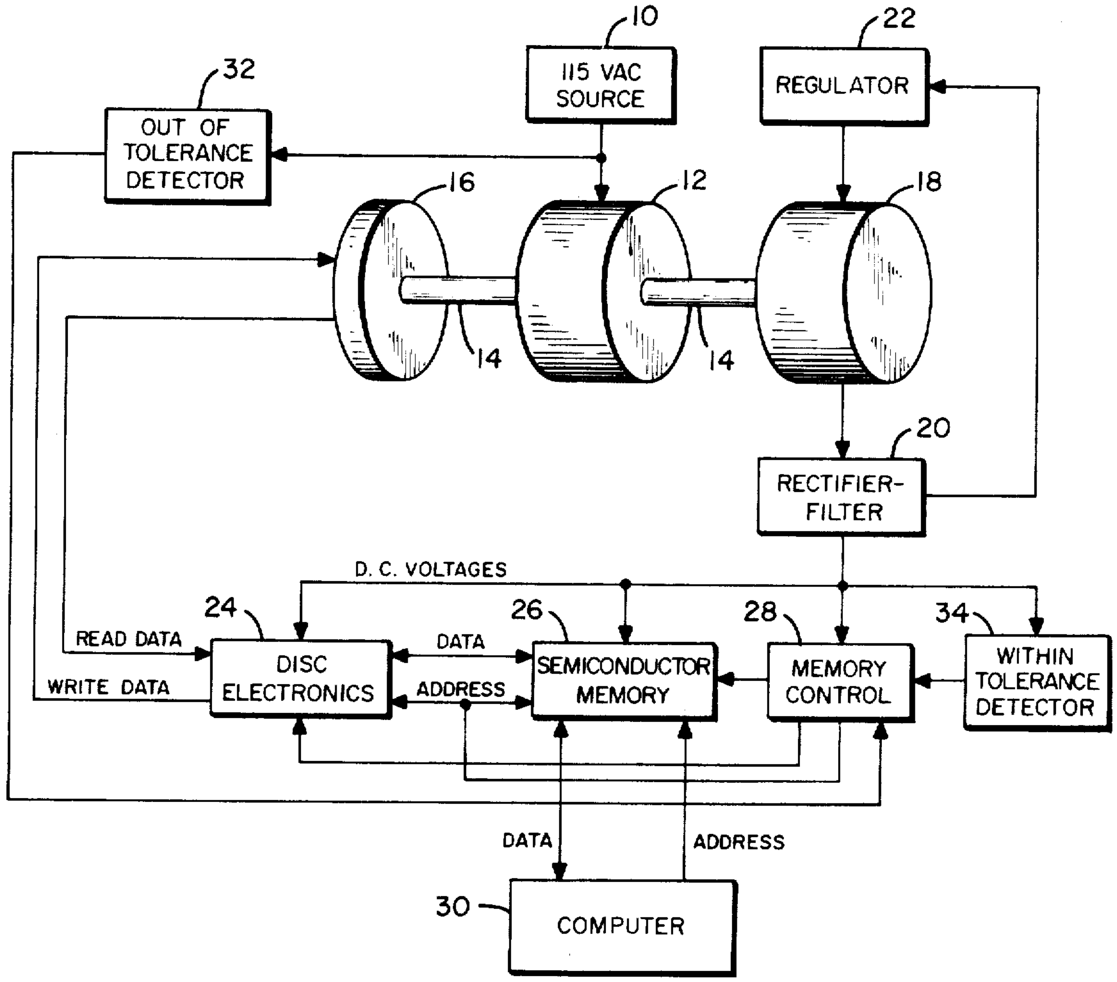
10
115 VAC SOURCE
22
REGULATOR
32
OUT OF TOLERANCE DETECTOR
16
12
18
14
14
20
RECTIFIER-FILTER
D. C. VOLTAGES
24
26
28
34
READ DATA
WRITE DATA
DISC ELECTRONICS
DATA
ADDRESS
SEMICONDUCTOR MEMORY
MEMORY CONTROL
WITHIN TOLERANCE DETECTOR
DATA
ADDRESS
30
COMPUTER

VOLATILE MEMORY PROTECTION

BACKGROUND OF THE INVENTION

In the prior art several systems have been proposed for preventing the loss of information stored in memory systems upon the occurrence of system failure. In the Levinson, et al., U.S. Pat. No. 3,147,462 there is proposed the use of a standby magnetic drum which upon the detection of a reduction of speed of the rotating primary magnetic drum is brought up to speed at which time the information stored in the primary magnetic drum is transferred into the standby magnetic drum. This protection system is useful only when the main power source is operative to provide the required electrical power to the system. Such magnetic drums are nonvolatile memories requiring no electrical power to maintain the logical significance of the information stored therein.

The proposed use of semiconductor memories for main memory modules in computer systems requires some means of retrieving or retaining the information stored therein upon failure of electrical power coupled thereto. Such semiconductor memories are volatile memories requiring electrical power to maintain the logical significance of the information stored therein, for the information is generally stored as electrical charges across a high impedence cell. Loss of electrical power permits these electrical charges to discharge or leak off exponentially with time such that maximum power loss times in the order of 1 millisecond (ms) duration are allowable. However, beyond that duration the semiconductor memory must be cyclically "refreshed." In the publication "Pulsed Standby Battery Saves MOS Memory Data," Electronics, May 8, 1972, pages 102, 103 there is proposed a system in which a standby battery is pulsed at a 1,000 Hz rate for a pulse width of 1 microsecond ($\mu$s) to refresh a random-access memory during power failure. However, this system is limited to the standby battery characteristics.

SUMMARY OF THE INVENTION

In the present invention there is proposed a system for retrieving the information stored in a volatile memory upon house-power failure. During normal system operation the 115 VAC house-power source supplies the required electrical power to a motor that drives a dynamic nonvolatile memory, e.g., a rotating magnetic disc or drum, such that the nonvolatile memory is continuously maintained at normal operating speed. Mechanically coupled to the rotating memory is a rotating alternator. The alternator supplies the necessary electrical power to operate a static volatile memory, e.g., a semiconductor memory, during normal system operation.

Upon house-power failure the rotating motor-alternator-memory combination has sufficient kinetic energy stored in its rotating components to continue rotating at substantially unreduced speed for a sufficient period of time to continue providing electrical power at normal levels. A first detector detects the loss of house-power and enables the still rotating alternator to provide the necessary power to transfer the information stored in the volatile memory into the nonvolatile memory. Upon reestablishment of house-power a second detector senses when normal power is available to the memories and thereon enables the transfer of information stored in the nonvolatile memory back to its original location in the volatile memory. Thus, the alternator is utilized as the power source for the volatile memory during normal system operation and is utilized as the power source during house-power failure and reestablishment to transfer information between the volatile memory and the nonvolatile memory.

BRIEF DESCRIPTION OF THE DRAWINGS

The single FIGURE is a block diagram of the memory system incorporating the present invention.

DESCRIPTION OF THE PREFERRED EMBODIMENTS

With particular reference to the single FIGURE there is presented a block diagram of a memory system incorporating the present invention. During normal system operation the 115 VAC house-power source 10 supplies the required electrical power to a motor 12 that through a common shaft 14 drives a magnetic disc 16 and an alternator 18. During normal system operation the motor 12 continuously maintains the magnetic disc 16 and the alternator 18 at normal operating speeds. While at normal operating speed the alternator 18 generates a three phase voltage which is rectified and filtered at rectifier-filter 20. A regulator 22 senses the level of the DC voltage in rectifier-filter 20 and maintains such DC voltage within a normal range by modulating the current through the field winding of alternator 18.

Responsively coupled to the rectifier-filter 20 are disc electronics 24 (See the Singer Librascope Product Specification P180000200 for the description of a magnetic disc memory system that should define an exemplary magnetic disc 16 and the associated disc electronics 24.), semiconductor memory 26 (See the Microsystem International Application Bulletin 40006 for the description of a semiconductor memory system that would define an exemplary semiconductor memory 26.), and memory controller 28 which generates the control signals defined by disc electronics 24 and semiconductor memory 26. During normal system operation, semiconductor memory 26 is under control of computer 30, or an I/O controller, while the necessary power to operate semiconductor memory 26 is provided thereto by rectifier-filter 20. Semiconductor memory 26 is a volatile memory requiring some means of retrieving or retaining the information stored therein upon failure of electrical power coupled thereto. Such volatile memory requires electrical power to maintain the logical significance of the information stored therein, for the information is generally stored as electrical charges across a high impedence cell. Loss of electrical power permits these electrical charges to discharge exponentially with time such that semiconductor memory 26 must be cyclically "refreshed". Such cyclical refreshing of semiconductor memory 26 may be under control of memory controller 28 or computer 30.

If the house-power source 10 should fail or should couple to motor 12 a signal outside of the normal range, detector 32 couples a system-off signal to memory controller 28. See the Boudreau, et al., U.S. Pat. No. 3,274,444 for the description of a voltage sensor that would define an exemplary detector 32, 34. Memory controller 28, in response to the system-off signal from detector 32, enables, through the DC voltages from rectifier-filter 20, the information stored in semiconductor memory 26 to be transferred into magnetic disc 16 by means of the associated disc electronics 24.

As stated above, upon house-power failure the motor-alternator combination has sufficient kinetic energy stored in its rotating components to continue rotating at substantially unreduced speed for a sufficient period of time to continue providing electrical power through rectifier-filter 20 within normal range. Assuming a typical data rate for a disc memory 16 being 2.4 $\times 10^6$ bits/second with semiconductor memory 26 being a 16K $\times$ 32-bit semiconductor memory which consumes 200 watts, total time required to transfer the information stored in semiconductor memory 26 into magnetic disc 16 is approximately 0.208 seconds with the total electrical energy required being 42 watt-seconds. A calculation of the kinetic energy stored in the magnetic disc 16, motor 12, alternator 18 combination indicates that 464 watt-seconds are available and that 88 watt-seconds could be extracted for a 10 percent reduction in speed. Assuming a power conversion efficiency of 70 percent, ample electrical power is available to transfer the information stored in semiconductor memory 26 into magnetic disc 18 during the short time available after detection of house-power failure.

Upon reestablishment of house-power from source 10 motor 12 is again driven up to normal operating speed. When motor 12 and alternator 18 have been continuously maintained at a normal operating speed for a sufficient period of time the DC voltages emitted by rectifier-filter 20 are stabilized within normal range. At this time, detector 34 determines that the output of rectifier-filter 20 has stabilized coupling a system-on signal to memory controller 28. Memory controller 28, when effected by the system-on signal, by means of the DC voltages from rectifier-filter 20 enables disc electronics 24 to transfer the information stored in magnetic disc 16 back into semiconductor memory 26. Thus, the alternator 18 through rectifier-filter 20 is utilized as the power source for the volatile memory system of semiconductor memory 26 during normal system operation and is also utilized during system failure and reestablishment to transfer information between the volatile memory of semiconductor memory 26 and the nonvolatile memory of magnetic disc 16.

What is claimed is:

1. A volatile memory protection system, comprising:

a volatile memory;
a rotatable nonvolatile memory;
a rotatable electrical motor means;
a rotatable electrical system-power generator means;

rotatable shaft means mechanically connecting said motor means, said nonvolatile memory and said generator means for forming a rotatable motor-memory-generator combination;
house-power means coupling electrical house-power to said motor means for rotating said motor-memory-generator combination at a normal rotating speed during normal system operation, said generator means being rotated to generate electrical system-power;
means for coupling said system-power from said generator means to said volatile and nonvolatile memories;
addressing means coupled to said volatile memory for transferring data information between said volatile memory and said addressing means during normal system operation using said system-power;

means for coupling data information between said volatile and nonvolatile memories;
first detector means responsively coupled to said motor-memory-generator combination for generating a system-off signal indicating that said motor-memory-generator combination is rotating below said normal rotating speed;
memory control means coupled to said volatile and nonvolatile memories, said memory control means responsively coupled to said first detector means for transferring data information from said volatile memory into said nonvolatile memory using said system-power when affected by said system-off signal.

2. The system of claim 1 in which said motor means, said nonvolatile memory and said generator means share a common rotatable shaft.

3. The system of claim 1 further including:
second detector means responsively coupled to said motor-memory-generator combination for generating a system-on signal indicating that said motor-memory-generator combination is rotating at said normal rotating speed; and,
said memory control means responsively coupled to said second detector means for transferring data information from said nonvolatile memory into said volatile memory using said system-power when affected by said system-on signal.

4. A volatile memory protection system, comprising:

a volatile memory;
a rotatable nonvolatile memory;
a rotatable electrical motor means;
a rotatable electrical system-power generator means;

a common rotatable shaft means, said motor means, said nonvolatile memory and said generator means sharing said shaft means for forming a rotatable motor-memory-generator combination;
house-power means coupling electrical house-power to said motor means for rotating said motor-memory-generator combination at a normal rotating speed during normal system operation, said generator means being rotated to generate electrical system-power;
means for coupling said system-power from said generator means to said volatile and nonvolatile memories;
means for coupling data information between said volatile and nonvolatile memories;
addressing means coupled to said volatile memory for transferring data information between said volatile memory and said addressing means during normal system operation using said system-power;

first detector means responsively coupled to said motor-memory-generator combination for generating a system-off signal indicating that said motor-memory-generator combination is rotating below said normal rotating speed;

second detector means responsively coupled to said motor-memory-generator combination for generating a system-on signal indicating that said motor-memory-generator combination is again rotating at said normal rotating speed;

memory control means coupled to said volatile and nonvolatile memories controlling the transfer of data information therebetween, said memory control means responsively coupled to said first and second detector means for transferring the data information stored in said volatile memory into said nonvolatile memory using said system-power when affected by said system-off signal and for transferring the data information stored in said nonvolatile memory back into said volatile memory using said system-power when affected by said system-on signal.

5. A volatile memory protection system, comprising:

a volatile memory;

a rotatable nonvolatile memory;

a rotatable electrical motor means;

a rotatable electrical system-power generator means;

a common rotatable shaft means mechanically connecting said motor means, said nonvolatile memory and said generator means for forming a rotatable motor-memory-generator combination;

house-power means coupling electrical house-power to said motor means for rotating said motor-memory-generator combination at a normal rotating speed during normal system operation, said generator means being rotated to generate electrical system-power;

means for coupling said system-power from said generator means to said volatile and nonvolatile memories;

means for coupling data information between said volatile and nonvolatile memories;

addressing means coupled to said volatile memory for addressing data information that is to be read into said volatile memory from said addressing means only during normal system operation or that is to be read out of said volatile memory into said addressing means only during normal system operation;

first detector means responsively coupled to said motor-memory-generator combination for generating a system-off signal indicating that said motor-memory-generator combination is rotating below said normal rotating speed;

second detector means responsively coupled to said motor-memory-generator combination for generating a system-on signal indicating that said motor-memory-generator combination is rotating at said normal rotating speed;

memory control means coupled to said volatile and nonvolatile memories and controlling the transfer of data information there-between, said memory control means responsively coupled to said first and second detector means for transferring data information stored in said volatile memory into said nonvolatile memory using said system-power when affected by said system-off signal and for transferring data information stored in said nonvolatile memory back into said volatile memory using said system-power when affected by said system-on signal.

* * * * *